A. G. ERICKSON.
PLOW.
APPLICATION FILED MAY 2, 1907.
910,803.
Patented Jan. 26, 1909.
2 SHEETS—SHEET 1.
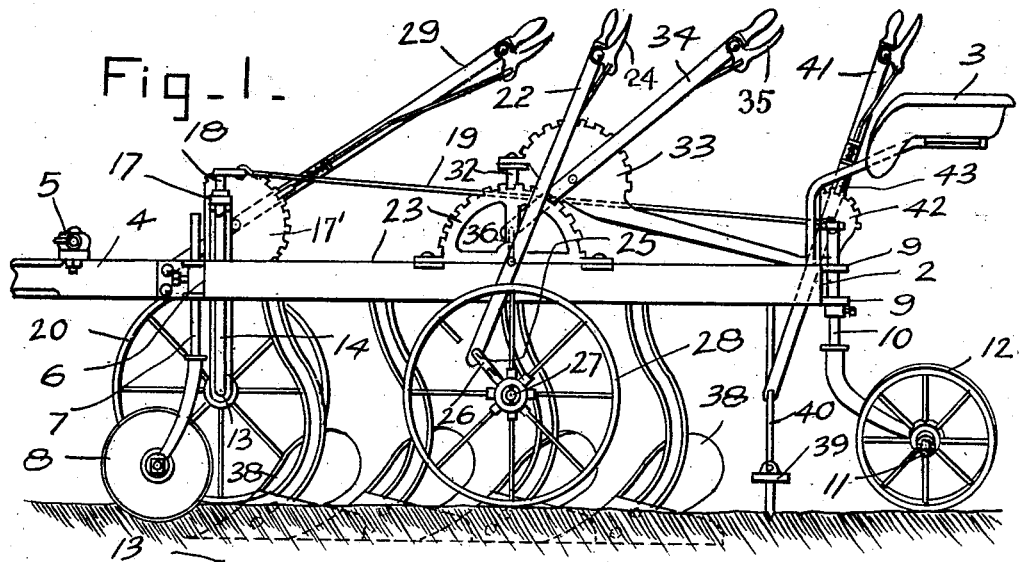
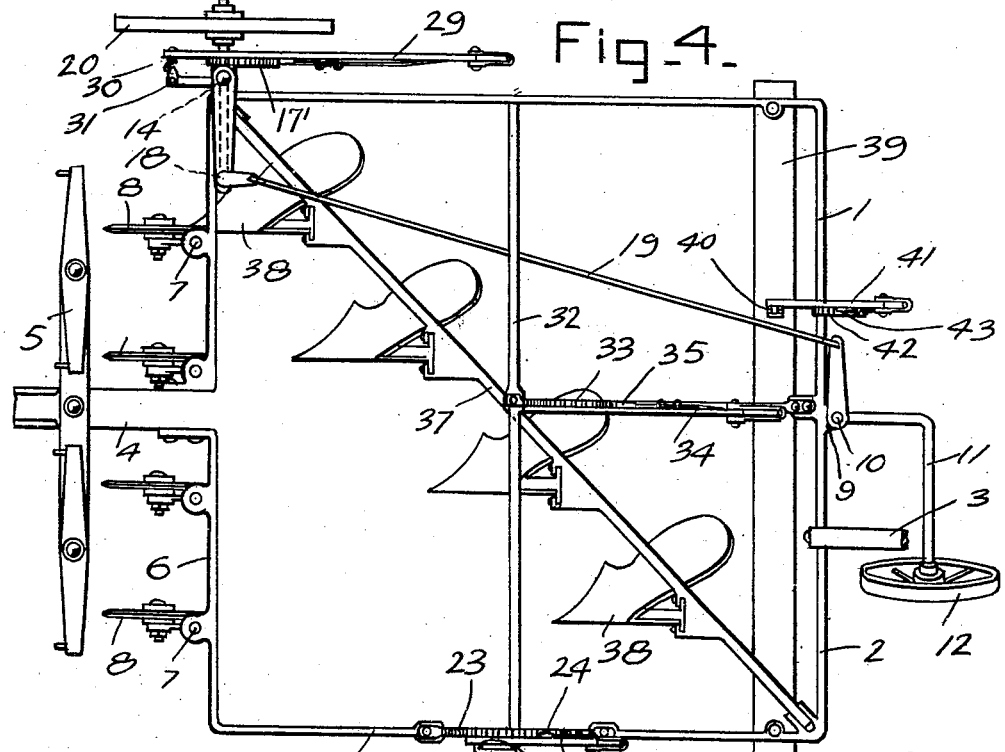

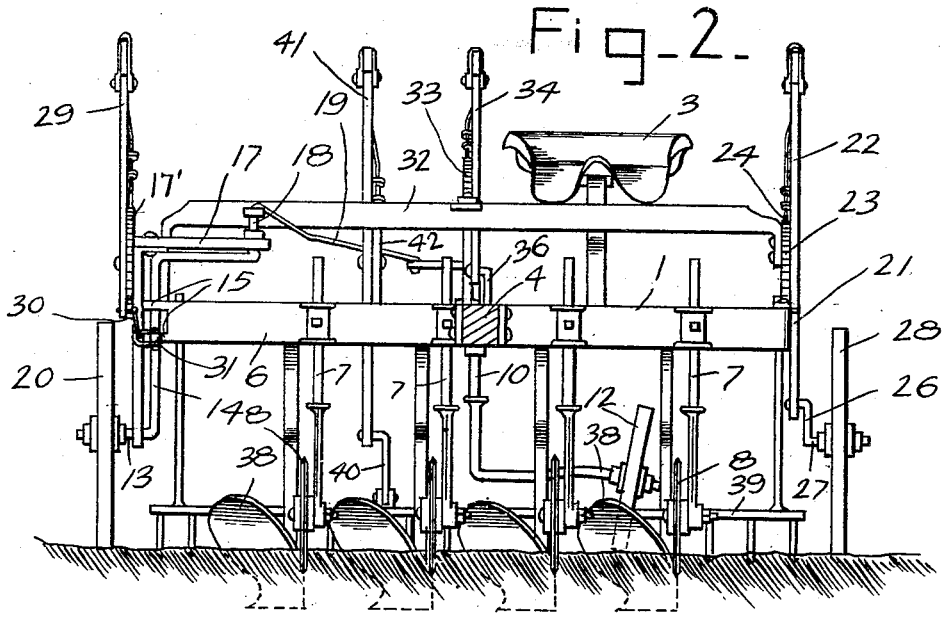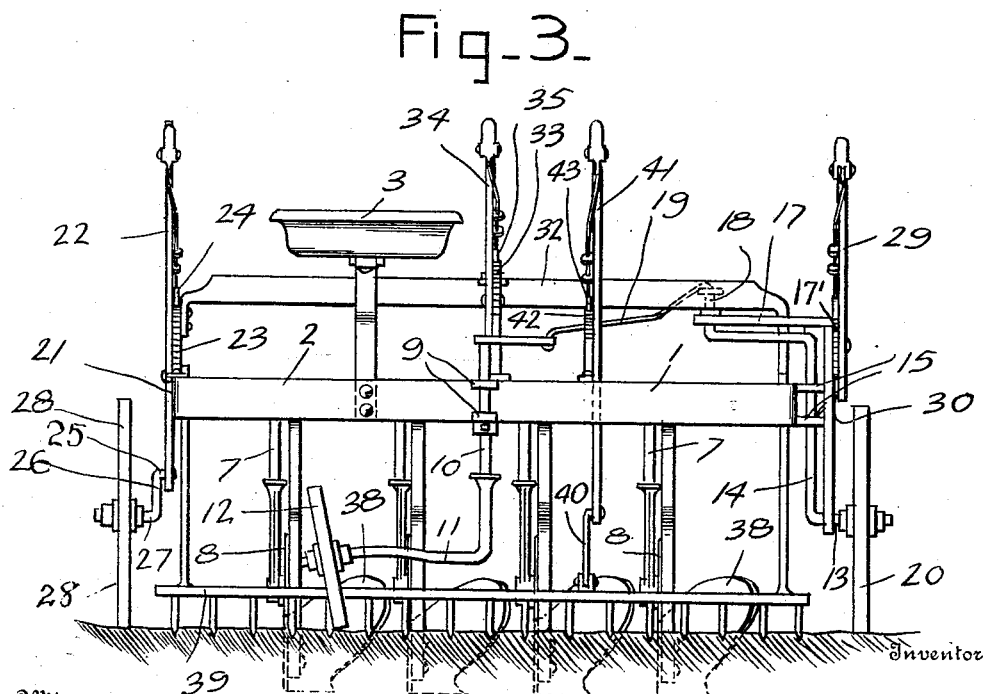

UNITED STATES PATENT OFFICE.

ANDREW G. ERICKSON, OF OHIO, ILLINOIS.

PLOW.

No. 910,803.

Specification of Letters Patent.

Patented Jan. 26, 1909.

Application filed May 2, 1907. Serial No. 371,475.

*To all whom it may concern:*

Be it known that I, ANDREW G. ERICKSON, a citizen of the United States, residing at Ohio, in the county of Bureau, State of Illinois, have invented certain new and useful Improvements in Plows; and I do hereby declare the following to be a full, clear, and exact description of the invention, such as will enable others skilled in the art to which it appertains to make and use the same.

This invention relates to new and useful improvements in plows and it has particular reference to a plow employing means for breaking, turning and leveling the ground.

In connection with a plow of the above type the invention aims as a primary object to provide a novel construction, combination and arrangement of parts, the details of which will appear in the course of the following description, in which reference is had to the accompanying drawings forming a part of this specification, like characters of reference designating similar parts throughout the several views, wherein:

Figure 1 is a side elevation of a plow constructed in accordance with the present invention. Fig. 2 is a front elevation thereof. Fig. 3 is a rear elevation thereof, and, Fig. 4 is a top plan view thereof.

Referring specifically to the accompanying drawings, the numeral 1 designates a frame of rectangular outlines, from the rear bar 2 of which a driver's seat 3 is supported, the tongue 4, equipped with the whiffle-trees 5 projecting forwardly from the front bar 6, the latter being provided with depending spaced standards 7, which support rotatable disks 8, employed for breaking the ground.

The frame 1 is provided with brackets 9 projecting rearwardly from its rear bar and surrounding the vertical arm 10 of an axle 11 upon which a guide for trailer wheel 12 is mounted. A similar axle 13 has its vertical arm 14 projected through brackets 15, extending laterally from the front bar 6. The axle 13 also has connection with an L-shaped member 17 through which an angular extension 18 of the arm 14 is projected, the arms 14 and 10 being reinforced by a diagonal member 19 connecting the same. A wheel 20 similar to the wheel 12 is mounted upon the axle 13.

The frame 1 carries upon its side bar 21 opposite to the wheel 20, a pivoted lever 22 working about a quadrant 23 and having a pawl 24 for engagement therewith. The lever 22 is pivoted at 25 to the angular arm 26 of an axle 27 upon which is mounted a traction wheel 28. The frame 1 is raised or lowered on one side by movement of the lever 22 which by virtue of its connection with the arm 26 moves said frame with relation to the wheel 28. The frame 1 is raised or lowered on its other side by means of a lever 29 pivoted to the segment 17' and connected by a link 30 with an extension 31 projecting forwardly from the front bar 6.

Between the front and rear bars 6 and 2 a transverse member 32 is supported which coacts with said rear bar to afford a mount for a rack quadrant 33, a lever 34 being pivoted to the latter and having a pawl 35 for engagement therewith. Pivotally depending from the lower end of the lever 34 is a rod 36 which supports a diagonal bar 37, the latter carrying the depending plows 38 arranged in gang series rearwardly of the disks 8 and serving to turn the ground after it has been broken by the disks.

A vertically adjustable transverse rake 39 follows in the path of the plows 38 and the latter is suspended by means of rods or wires 40 from the lower end of a lever 41 pivoted to a rack section 42 supported upon the rear bar 2, the lever 41 having a pawl 43 for engagement with said sector. The function of the rake is to level and break up the lumps in the ground after it has been acted on by the disks and plows, the several elements being adapted for use conjunctively or independently according to the circumstances.

From the foregoing description, it will be seen that simple and efficient means are provided for accomplishing the objects of the invention, but, while the elements herein shown and described are well adapted to serve the functions set forth, it is obvious that various minor changes may be made in the proportions, shape and arrangement of the several parts without departing from the spirit and scope of the invention as defined in the appended claim.

What is claimed is:

In a plow, a wheeled rectangular shaped frame, a diagonally disposed bar vertically slidable in said frame, plows depending from said bar and arranged in gang series, a toothed quadrant mounted centrally on the frame, a lever pivotally connected to the quadrant and having a locking pawl engaging the quadrant, connection between said lever and bar whereby the same can be raised and lowered, a trail wheel carried at the rear of said frame, means for simultaneously turning one of the wheels of the frame and the trail wheel, and means for raising and lowering each of the frame wheels.

In testimony whereof, I affix my signature, in presence of two witnesses.

ANDREW G. ERICKSON.

Witnesses:
TIMOTHY HANNAN,
JAMES FALEY.